(12) United States Patent
Stallbaumer et al.

(10) Patent No.: US 6,308,967 B1
(45) Date of Patent: Oct. 30, 2001

(54) DUAL HAND TRUCK

(75) Inventors: John J. Stallbaumer, Valley Center; Robert D. Rahn, Hillsboro, both of KS (US)

(73) Assignee: Harper Trucks, Inc., Wichita, KS (US)

( * ) Notice: Subject to any disclaimer, the term of this patent is extended or adjusted under 35 U.S.C. 154(b) by 0 days.

(21) Appl. No.: 09/587,172

(22) Filed: Jun. 2, 2000

(51) Int. Cl.[7] .................................................. B62B 5/00
(52) U.S. Cl. ................................. 280/47.18; 280/47.27
(58) Field of Search ........................... 280/47.131, 47.17, 280/47.18, 47.2, 651, 654, 47.24, 47.27, 47.28, 655

(56) References Cited

U.S. PATENT DOCUMENTS 3,785,669 * 1/1974 Doheny .............................. 280/47.18
5,536,034 * 7/1996 Miller .................................... 280/651
5,941,543 * 8/1999 Kazmark, Jr. ...................... 280/47.29

OTHER PUBLICATIONS

Harper Truck Catalog No. 190, pp. 12 & 14, Sep. 2000.

* cited by examiner

*Primary Examiner*—Kevin Hurley
(74) *Attorney, Agent, or Firm*—Edward L. Brown, Jr.

(57) ABSTRACT

A dual position hand truck includes a central frame having two side rails and a toe plate. Positioned at an upper end of the central frame is a U-shaped handle bar which has a hand gripping portion and two extended legs with castered wheels attached at their respective bottom ends. The handle bar is pivotally attached to the frame by a fixed shaft and a pair of support brackets. The support brackets also allow the extended legs to slide along their length. Attached to the support brackets is a spring biased locking bar which locks the handle bar against rotational movement relative to the frame.

8 Claims, 4 Drawing Sheets

DUAL HAND TRUCK

BACKGROUND OF THE INVENTION

1. Field of Invention

This invention relates to hand trucks commonly called dual hand trucks which can be used in two configurations—the conventional two-wheel configuration and the second configuration as a four-wheel platform truck with castered wheels on one end. Frequently users of hand trucks require alternate uses of the same truck which prompted the design of dual hand trucks at some time in the mid twentieth century. A conventional hand truck utilizes a toe plate on the bottom end of the truck and a pair of handles at the upper end for lifting and transporting a load by levering the toe plate under the load through manual use of handles and transporting the load balanced on the axle of the supporting wheels. Dual truck usage provides a horizontal load-carrying platform with four wheels, one at each corner, as a conventional platform truck is used.

2. Description of Prior Art

Hand trucks of varying designs have been around for the better part of the twentieth century as exemplified in applicants Catalog #190 published in January 1990. The design of hand trucks has varied over the years depending upon a variety of factors such as load capacity and specialized use, as shown in the above-mentioned Catalog. Dual truck designs of the prior art are exemplified in applicant's above-mentioned Catalog on page 12 where a design is shown where two removal pins lock the handle bar from both rotational and sliding movement of the handle bar in a DT series design. Another design is shown on page 12 of the same Catalog which is the EDT series wherein two pins lock the handle bar in one of a pair of fixed sleeves which are positioned 90° from each other. Another prior art design is shown on page 16 of said catalog which is an ADT series design which pivotally latches the lower ends of handle bar legs both to the side rails of the truck and also against any rotational movement of the handle bar relative to the side rails. This latter design compared to the present invention does not have the functional reliability of the design of the present invention and is subject to malfunction under heavy use.

SUMMARY OF THE INVENTION

All dual hand trucks utilize a U-shaped handle bar with extended legs which, in its two-wheel configuration, the handle bar lies juxaposed and attached to the hand rails of the truck, while in the four-wheel configuration, the plane of the handle bar is positioned 90° to the plane of the side rails and the handle bar is fully extended so the castered wheels on the ends of the handle bar are so positioned that the side rails of the hand truck are parallel to the ground.

These two configurations of the hand truck require that the handle bar have two locked positions, one with the handle bar overlying and juxaposed next to the side rails of the hand truck and a second position with the hand rail fully extended from the upper end of the hand truck and angled 90° to the side rails of the hand truck. This sliding and rotational movement is achieved in a variety of ways, some of which are discussed in the abovementioned prior art. The present invention achieves this sliding and rotational movement of the handle bar by latching and locking structure which is unique from the prior art designs. The latching assembly is positioned at the upper ends of the hand truck side rails approximate the hands of the operator which is most convenient when converting the hand truck from the two-wheeled configuration to the four-wheeled configuration.

It is therefore the principal object of the present invention to provide a dual position hand truck which readily accommodates the hands of the operator when unlocking and converting the truck from its two-wheel configuration to its four-wheel platform configuration.

Another object of the present invention is to provide a simplified latching and locking structure for a dual hand truck.

Another object of the present invention is to provide a dual hand truck design which is less prone to malfunction.

Other objects and advantages will be apparent in the following detailed description taken in conjunction with the accompanying drawings.

DESCRIPTION OF THE PREFERRED EMBODIMENT

Figure 1:
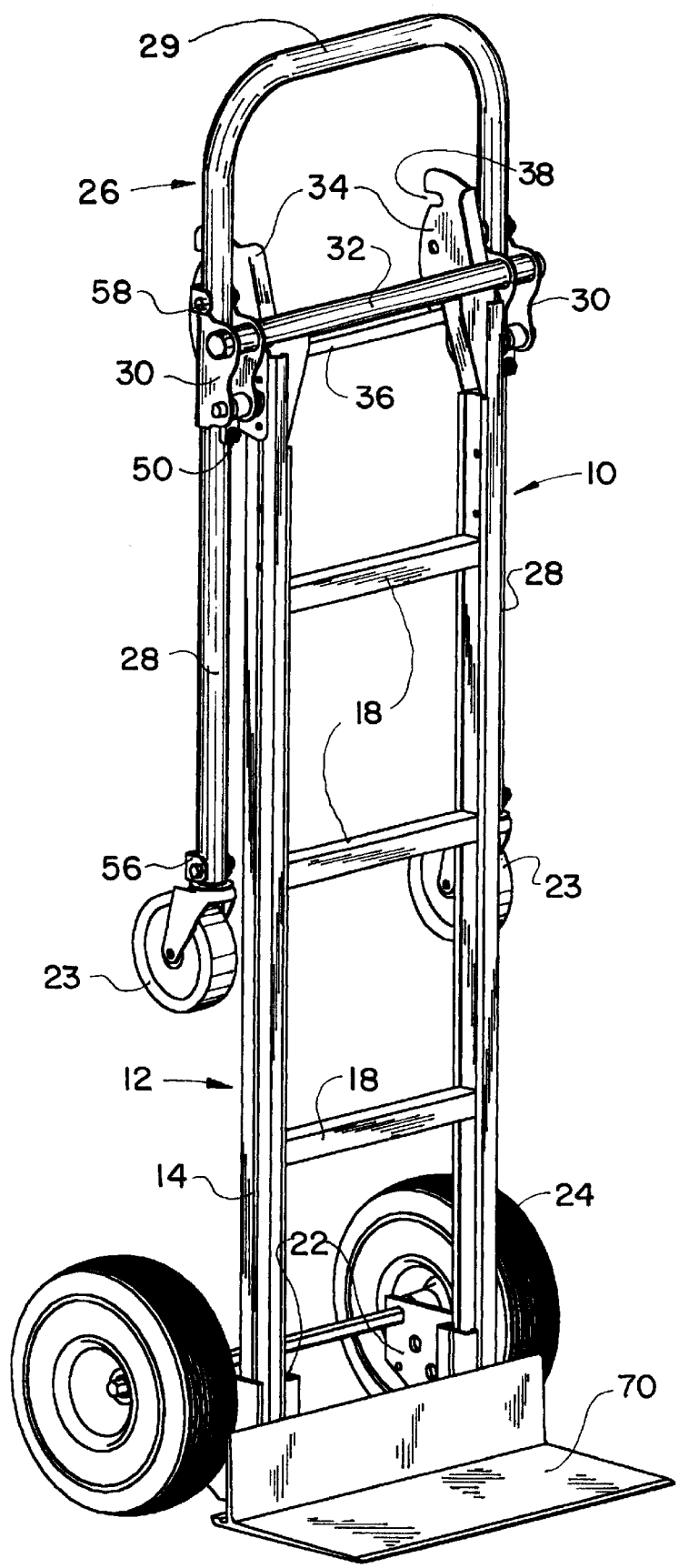
FIG. 1 is an isometric view of the dual position hand truck of the present invention in the two-wheeled configuration.
Figure 5:
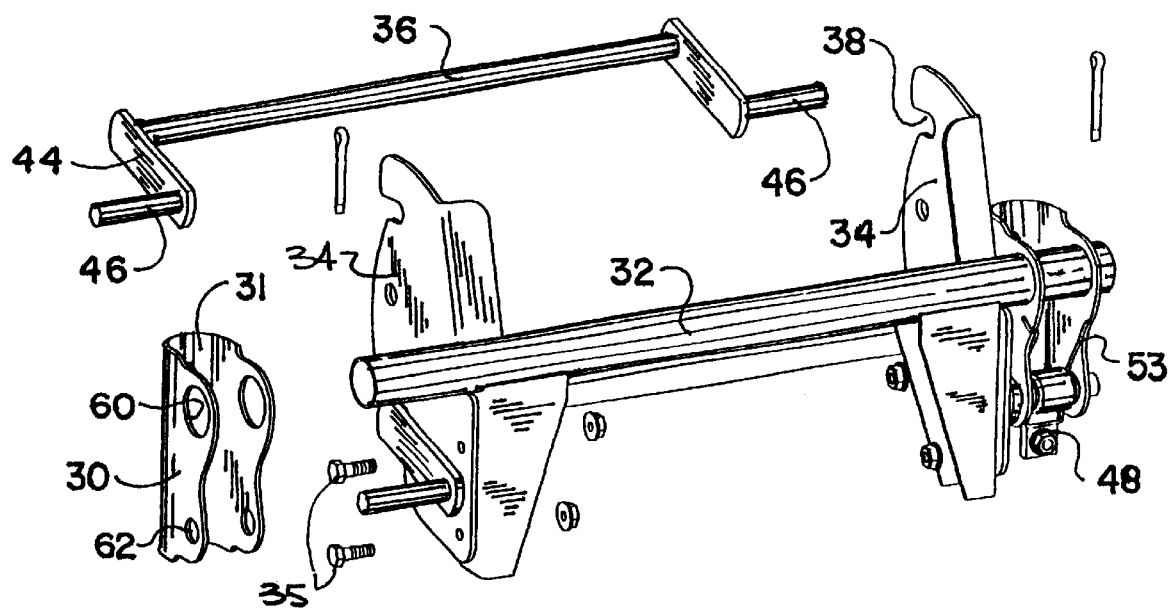
FIG. 5 is a partial isometric exploded view of the latching and locking mechanism of the dual hand truck.
Figure 5:
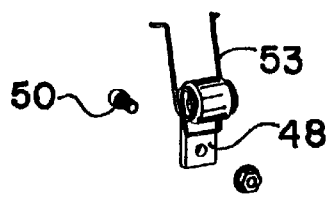
Figure 4:
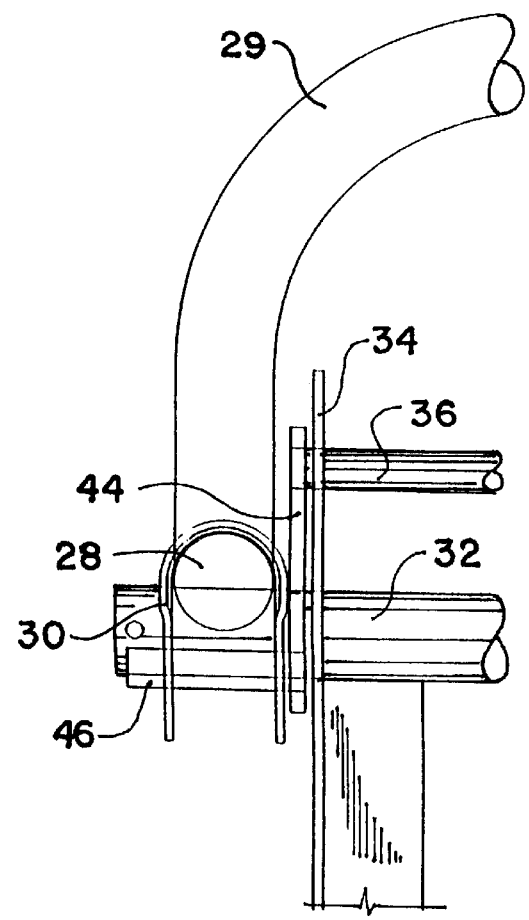
FIG. 4 is an end view taken along line 4—4 of FIG. 3 with the handle bar in the four-wheel position.

Turning now to the drawings in which like reference numerals indicate corresponding elements throughout all of the views, attention is first directed to FIG. 1 which generally illustrates the dual hand truck of the present invention by reference numeral 10. The truck 10 comprises a central frame 12 which is made up of two side rails 14 and 16 joined by three cross rails 18 along their length. Adjoining the lower ends of the side rails 14 and 16 is a toe plate 20 carrying two axle support brackets 22 which in turn support wheels 24 and are anchored to side rails 14 and 16. Positioned at the upper end of frame 12 is a U-shaped handle bar 26 which has a hand gripping portion 29 and two extended legs 2:3 with castered wheels 23 attached to the bottom ends of legs 28. Handle bar 26 is pivotally attached to the frame 12 of the hand truck 10 on a fixed shaft 32 permitting the handle bar to pivot between its FIG. 1 and FIG. 2 positions. The shaft 32 is rigidly attached to a pair of latch plates 34 as best shown in FIG. 5 and latch plates 34 are in turn bolted to side rails 14 and 16 by bolts 35. The handle bar 26 is retained in a pair of leg support brackets 30 which freely pivot on shaft 32. Also handle bar 26 freely slides through support brackets 30 unto the support bracket 30 comes in contact with either handle stops 56 or 58, as seen in both FIGS. 1 and 2.

Latch plates 34 include two locking notches 38 and 40, which functions will later be described.

Figure 3:
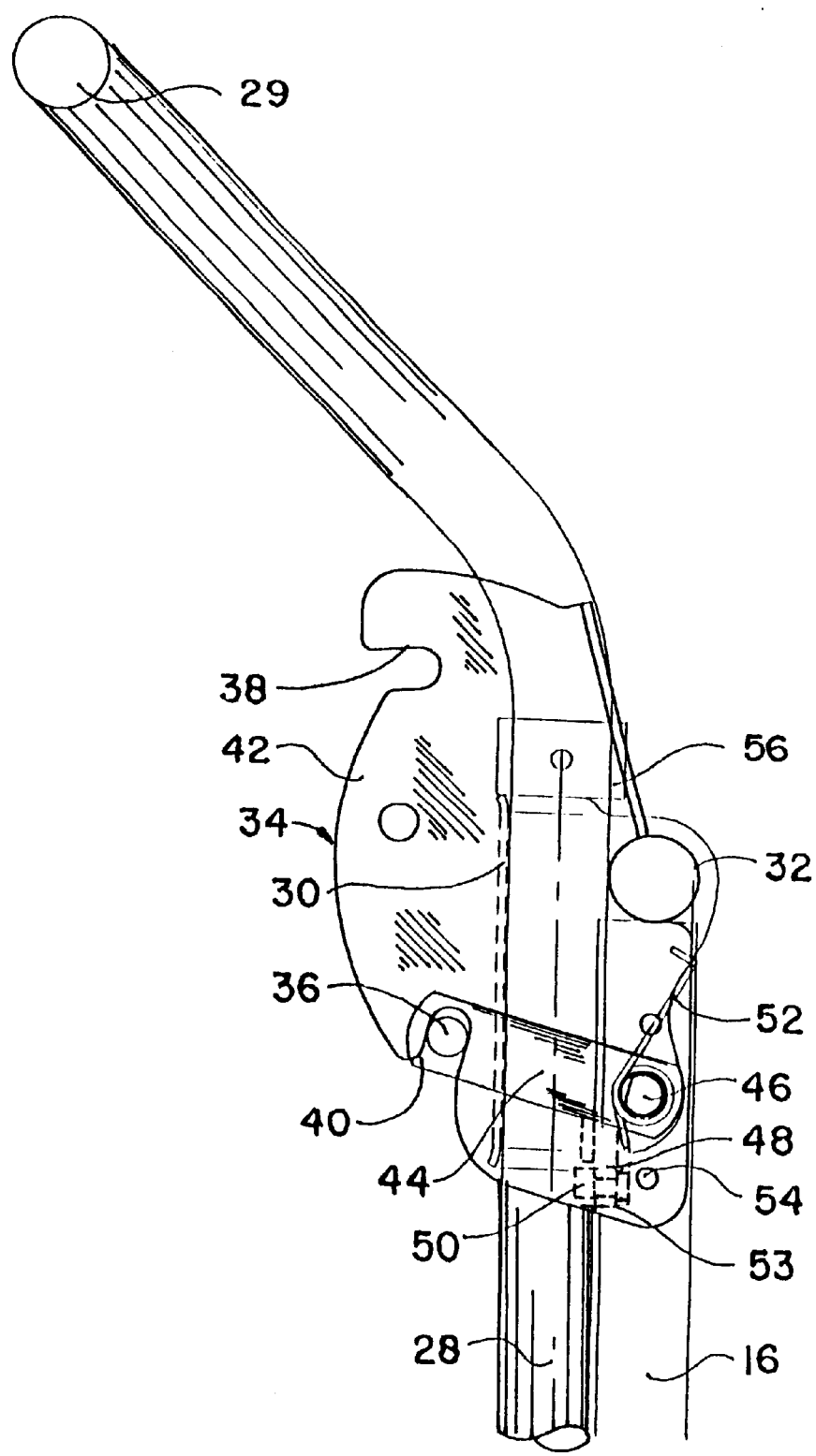
FIG. 3 is a side elevational view to an enlarged scale of the latching and locking assembly with portions in section and portions broken away with the handle bar in the two-wheel configuration.

Also attached to support brackets 30 is a locking bar 36 which is part of the latch assembly which locks the handle bar against rotational movement relative to the remainder of the truck 10. Locking bar 36, as best seen in FIG. 5, pivots about a pair of offset pins 46 which are journaled in openings 62 in leg support brackets 30. Pins 46 are connecting to locking bar 36 through a pair of arms 44 in a rigid welded construction. Locking bar 36, as seen in FIG. 3, is spring-biased in a clockwise direction by spring 52 through arm 48 and arm 44, thus holding locking bar 36 in notch 40 on latch plate 34. Since locking bar 36 is pivotally mounted on support bracket 30 and it engages notch 40, handle bar 28 is locked against rotation relative to the side rails 14 and 16 of the hand truck.

Also mounted on pins 46 are a pair of locking arms 48 which are integral with arms 44 and carry a locking pin 50 on the end thereof which is a common round-headed Allen bolt attached to arm 48 which engages opening 53 in handle bar 26, thus locking the handle bar against any sliding movement.

When locking bar 36, as shown in FIG. 3, is pulled downward in a counterclockwise direction out of notch 40, the handle bar 26 is free to rotate about its shaft 32 with bar 36 riding along arcuate surface 42 on latch plate 34. As handle bar 26 approaches a 90-degree angle between the side rails, spring biased latch bar 36 will engage notch 38, locking the handle bar 26 in its FIG. 2 dual truck configuration.

Figure 2:
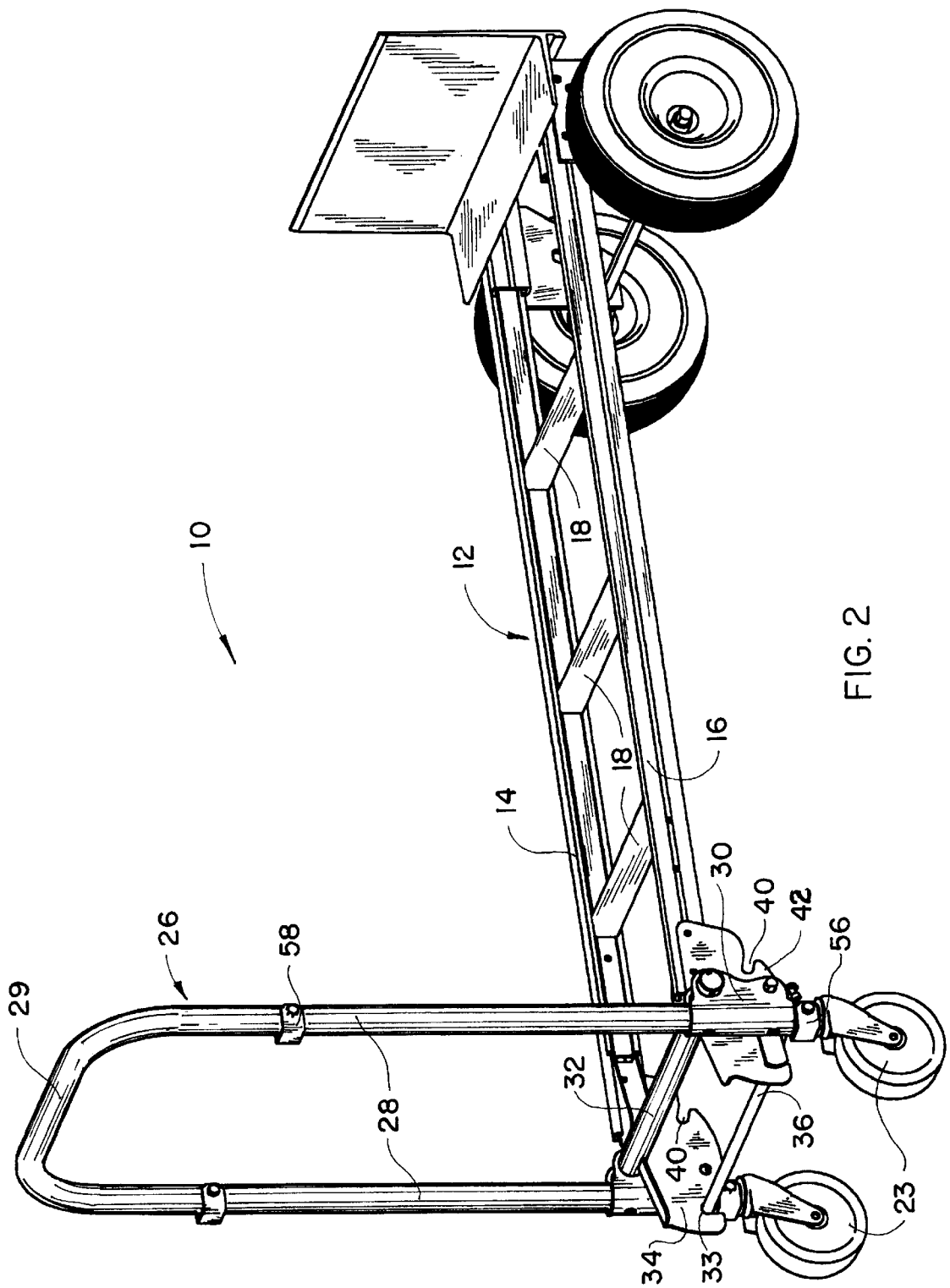
FIG. 2 is an isometric view of the dual hand truck in the four-wheeled platform truck configuration.

Once locking pin 50 disengages opening 53 in handle bar 26, the handle bar is free to slide outward toward its FIG. 2 position and is only restrained by handle bar stop 56 as it engages support bracket 30, as in FIG. 2. When handle bar 26 is fully retracted in its FIG. 1 two-wheel configuration, stop 58 on handle bar 26 engages the upper edge of support bracket 30 which aligns locking pin 50 with its opening 53 in handle bar 26; thus handle bar 26 is locked against both rotational and sliding movement and becomes an integral part of the hand truck for its two-wheel configuration, as seen in FIGS. 1 and 3.

OPERATION

Dual truck 10 functions in a two-wheel configuration, as shown in FIGS. 1 and 3, wherein handle bar 26 is lockably attached to the side rails 14 and 16 of the hand truck in juxtaposed relation so that the handle gripping portion 29 can be engaged by the operator to maneuver the hand truck.

To convert to the four-wheel platform configuration, as shown in FIG. 2, locking bar 36 is manually engaged and rotated downward in a counterclockwise direction, as seen in FIG. 3. Once bar 36 exits notch 40, the handle bar 26 is free to rotate in a clockwise direction with locking bar 36 riding along arcuate surface 42 due to the action of spring 52. When the handle bar 26 reaches a 90-degree position relative to the side rails of the hand truck, spring-biased bar 36 engages notch 38 and locks the handle bar 26 and its leg-supporting bracket 30 against further rotation due to the engagement in notch 38. As locking bar 36 is pulled downward, as it disengages notch 40, it also rotates arm 48 in a counterclockwise direction which disengages locking pin 50 from opening 53 in handle bar 26, thus allowing handle bar 26 to extend and slide outward from its FIG. 1 position toward its fully extended FIG. 2 position whereupon handle stop 56 engages support bracket 30. In this four wheel configuration, handle bar 26 is not locked against sliding movement in its support brackets 30 and the mere weight of the side rails retains the handle bar 26 in its fully extended position against stops 56.

If locking bar 36 of the hand truck is lifted off the ground from its FIG. 2 position, legs 28 of the handle bar are free to slide downward or in a retracted direction. As soon as locking bar 36 is pulled downward out of notch 38, the handle bar assembly is now free to rotate in a counterclockwise direction with locking bar 36 riding along arcuate surface 42 toward notch 40. Due to the biasing action of spring 52 when locking bar 36 reaches notch 40, the notch will be engaged and the handle bar 26 will be locked against further rotational movement, as seen in its FIG. 1 two-wheel configuration. Also as bar 36 engages notch 40, arm 44 rotates in a clockwise direction causing locking pin 50 to engage opening 53 and lock handle bar 26 against any further sliding movement. Notches 38 and 40 are placed for 90 degrees of rotation between the side rails of the truck 10 and the handle bar legs. The angular spacing could be 45 degrees rather than 90 degrees or there could be three notches with various angles of spacing. The handle portion 29 of handle bar 26 can be straight, as shown in FIGS. 1 and 2, or offset, as shown in FIGS. 3 and 5.

It is to be understood that the drawings and the descriptive matter are in all cases to be interpreted as merely illustrative of the principles of the invention, rather than as limiting the same in any way since it is contemplated that the various changes may be made in various elements to achieve like results without departing from the spirit of the invention or the scope of the appended claims.

What is claimed is:

1. A dual position hand truck which converts from a two-wheeled version to a four-wheeled platform truck comprising:

a pair of side rails having upper and lower ends joined by cross rails along their length and a toe plate for load supporting in the two wheel configuration joining the lower ends of the side rails;

an axle supporting a pair of wheels attached at the lower end of the side rails;

a U-shaped handle bar having a pair of extended parallel legs pivotally attached to the side rails at their upper ends;

a pair of castered wheels mounted on the ends of said legs for use in the four-wheeled platform version;

a pair of support brackets each bracket being pivotally mounted on a side rail, each bracket supporting one of said legs for sliding movement therein and rotational movement relative to the side rails;

at least one latch plate mounted on one of said rails having at least two latching positions for rotational locking of said legs;

a locking bar rotatably mounted on said support bracket for engaging the two latching positions on the latch plate and locking the legs of the handle bar in at least two angular positions;

at least one locking pin mounted on said support bracket for engaging one of said legs and preventing the handle bar from sliding movement in the support bracket, the locking pin being actuated by movement of said locking bar.

2. A dual position hand truck, as set forth in claim 1, wherein the locking bar includes a pair of arms normally positioned relative to the locking bar and a pair of pivot pins, each pin being mounted on one of said arms and offset from the locking bar, each pin being pivotally journaled in one of said support brackets to permit engagement of the latch plate in said latching positions.

3. A dual position hand truck, as set forth in claim 1 wherein there are two latch plates, each being mounted on the upper end of a side rail, the latching positions of each latch plate comprising at least two notches which can be releasably engaged by said locking bar.

4. A dual position hand truck, as set forth in claim 1, wherein the locking bar includes a pair of arms normally positioned relative to the locking bar and a pair of pivot pins, each pin being mounted on one of said arms and offset from the locking bar, each pin being pivotally journaled in one of said support brackets to permit engagement of the latch plate in said latching positions and the locking pins are each mounted on an arm which in turn is integral with one of said pivot pins whereby rotation of the locking bar also releasably engages the locking pins from the legs of the handle bar.

5. A dual position hand truck, as set forth in claim 1 wherein there are two latch plates, each being mounted on the upper end of a side rail, the latching positions of each latch plate comprising at least two notches which can be releasably engaged by said locking bar and the latch plates include an arcuate surface between the two notches and the locking pin is actuated by rotation of the locking bar which is spring biased against the arcuate surfaces.

6. A dual position hand truck, as set forth in claim 1, wherein the locking bar includes a pair of arms normally positioned relative to the locking bar and a pair of pivot pins, each pin being mounted on one of said arms and offset from the locking bar with the pins lying longitudinally parallel to the locking bar, with each pin being pivotally journaled in a support bracket to permit releasable engagement of the locking bar in at least two latching positions.

7. A dual position hand truck, as set forth in claim 1, wherein the two latching positions on the latch plate provide 90-degree rotation of the handle bar legs with one position of the legs lying parallel and juxtaposed to the side rails.

8. A dual position hand truck, as set forth in claim 1, wherein there are two latch plates, each mounted on the upper end of said side rails, the two latching positions comprise radial notches in the latch plates spaced substantially 90 degrees apart for engagement by said locking bar.

* * * * *